US011122092B2

(12) United States Patent
John et al.

(10) Patent No.: US 11,122,092 B2
(45) Date of Patent: Sep. 14, 2021

(54) SYSTEM AND METHOD FOR PRIORITIZING SIP REGISTRATIONS

(71) Applicant: Verizon Patent and Licensing Inc., Arlington, VA (US)

(72) Inventors: Toby Varughese John, Murphy, TX (US); Shashi Kotvali, Frisco, TX (US); Bibi M. Hakimzadeh, Fort Worth, TX (US); James S. Abraham, Carrollton, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 140 days.

(21) Appl. No.: 16/531,486

(22) Filed: Aug. 5, 2019

(65) Prior Publication Data
US 2021/0044633 A1 Feb. 11, 2021

(51) Int. Cl.
| | | |
|---|---|---|
| *H04J 3/14* | (2006.01) | |
| *H04L 1/00* | (2006.01) | |
| *H04L 29/06* | (2006.01) | |
| *H04L 12/851* | (2013.01) | |
| *H04W 12/08* | (2021.01) | |
| *H04W 4/90* | (2018.01) | |
| *H04L 12/801* | (2013.01) | |

(52) U.S. Cl.
CPC .......... *H04L 65/1073* (2013.01); *H04L 47/12* (2013.01); *H04L 47/24* (2013.01); *H04L 65/105* (2013.01); *H04L 65/1006* (2013.01); *H04L 65/1016* (2013.01); *H04W 4/90* (2018.02); *H04W 12/08* (2013.01)

(58) Field of Classification Search
CPC ..... H04L 65/1073; H04L 47/12; H04L 47/24; H04L 65/1006; H04L 65/1016; H04L 65/105; H04W 4/90; H04W 12/08
USPC ........................................................ 370/230
See application file for complete search history.

(56) References Cited

U.S. PATENT DOCUMENTS

| | | | | |
|---|---|---|---|---|
| 10,021,250 | B1* | 7/2018 | Chen ........................ | H04W 4/90 |
| 2011/0096769 | A1* | 4/2011 | Sim ......................... | H04W 4/029 |
| | | | | 370/352 |
| 2011/0281548 | A1* | 11/2011 | Liang ..................... | H04W 76/50 |
| | | | | 455/404.1 |
| 2016/0374005 | A1* | 12/2016 | Cho ........................ | H04W 48/06 |
| 2019/0044980 | A1* | 2/2019 | Russell ................... | H04W 12/06 |
| 2020/0145465 | A1* | 5/2020 | Al-Mehdar .......... | H04L 65/1016 |
| 2020/0329075 | A1* | 10/2020 | Zhang ................. | H04L 65/1003 |

OTHER PUBLICATIONS

Hill et al. "Design Considerations for Session Initiation Protocol (SIP) Overload Control", Aug. 2011 (Year: 2011).*

* cited by examiner

*Primary Examiner* — Maharishi V Khirodhar (57) ABSTRACT

Systems and methods implement prioritized IP Multimedia System (IMS) registration procedures for Emergency and Priority Service users. A network device in an IMS network, receives, from a user equipment device, a Session Initiation Protocol (SIP) Register message that includes a priority indication. The network device detects the priority indication in the SIP Register message and provides, based on the priority indication, priority registration for the user equipment device when the network device is in an overloaded condition.

20 Claims, 9 Drawing Sheets

Session Initiation Protocol (REGISTER)
   Request-Line: REGISTER sip:Doe.com SIP/2.0
     Method: REGISTER
     Request-URI: sip:Doe.com
       Request-URI Host Part: Doe.com
   Message Header
     Max-Forwards: 70
     Contact: <sip:John@[192.0.25]:5060>
     To: <sip: John@Doe.com>
     From: <sip: John@Doe.com>
     Call-ID: zLTwecR1wiCy2IRNVVy0nw
     CSeq: 1 REGISTER
     Expires: 60000
     Content-Length: 0
     Resource-Priority: wps.0,ets.0

SYSTEM AND METHOD FOR PRIORITIZING SIP REGISTRATIONS

BACKGROUND INFORMATION

Traffic from Emergency and Priority Service telephony subscribers receives priority treatment when connected to wireless transport networks. Virtually all subscribers that utilize the IP Multimedia System (IMS), including Emergency and Priority Service telephony subscribers, are required to complete a registration procedure using Session Initiation Protocol (SIP) prior to gaining access to IMS services. During overload conditions in the IMS network, some new connection requests (e.g., SIP registration requests) may not be processed.

DETAILED DESCRIPTION OF PREFERRED EMBODIMENTS

The following detailed description refers to the accompanying drawings. The same reference numbers in different drawings identify the same or similar elements.

Emergency and Priority Service users (e.g., devices that are assigned a network Access Class (AC) of 11-15) may be granted priority access to network services. To gain access to IP Multimedia System (IMS) services, user equipment (UE) devices are required to send a Session Initiation Protocol (SIP) Register message to a network device (e.g., a Call Session Control Function (CSCF)) in the IMS network. Although Emergency and Priority Service users may receive priority treatment after connecting to the IMS network, these users currently receive no special treatment or prioritization for establishing new IMS connections. Particularly, there is currently no prioritization of SIP Register messages in IMS networks. Thus, when congestion/overload conditions exist in the IMS network, SIP Registration requests from Emergency and Priority Service users may be delayed or may not be processed, preventing connections for IMS services such as voice, video, or short message service (SMS).

Systems and methods described herein prioritize SIP Register messages at CSCF nodes utilizing the Access Control Class (ACC) Elementary File (EF) stored in the Universal Subscriber Identity Module (USIM) applet in the Universal Integrated Circuit Card (UICC) in UE devices. More particularly, prioritized IMS registration procedures are provided for AC 11-15 UE devices. According to an implementation, qualified UE devices may insert a SIP Resource-Priority Header (RPH) in the SIP Register message that designates a priority connection. CSCF nodes in an IMS network may detect the priority indicated in the RPH and apply priority queuing for the UE device.

Figure 1:
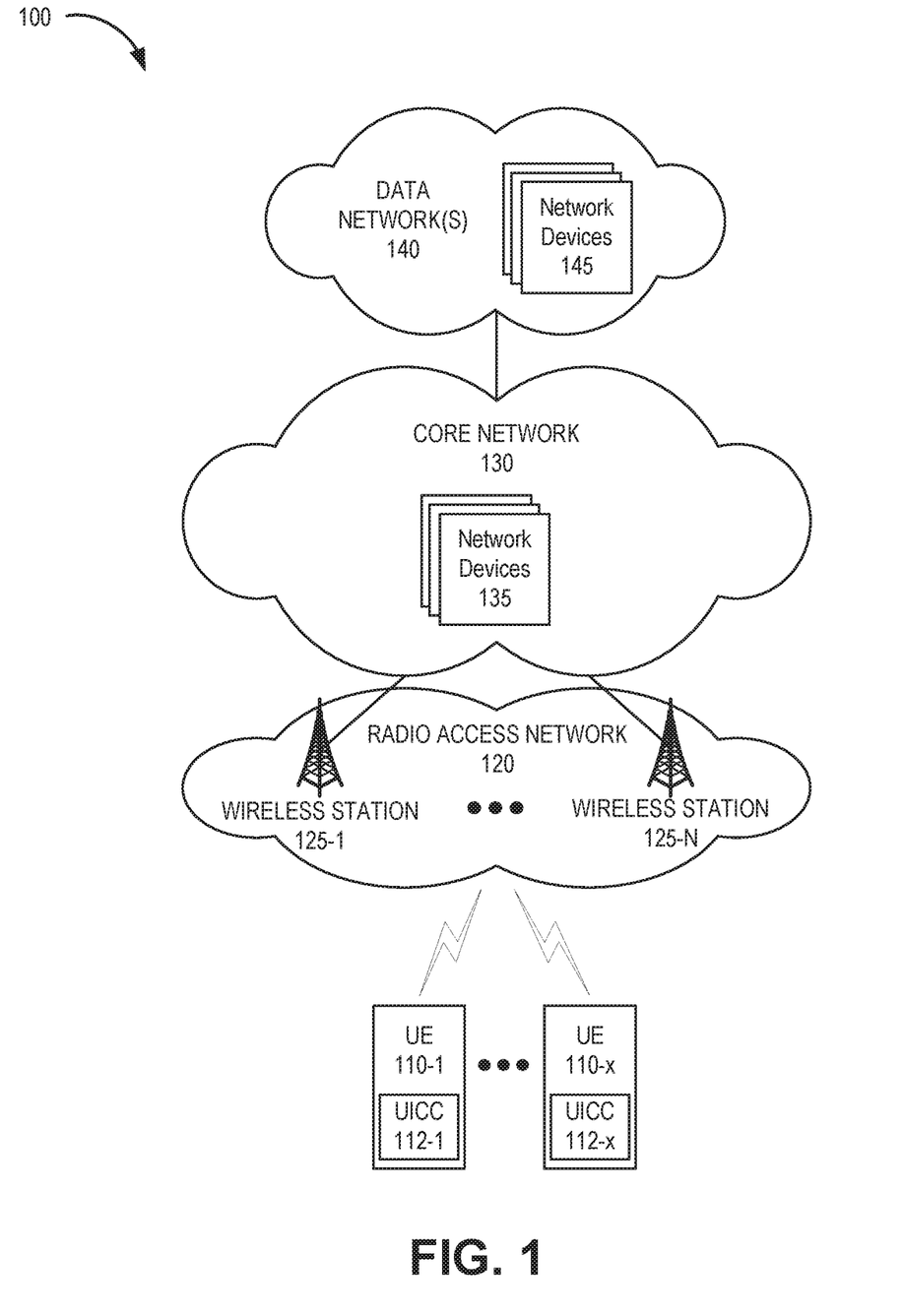
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include user equipment (UE) devices 110-1 to 110-X (referred to herein collectively as "UE devices 110" and individually as "UE device 110"), a radio access network 120, a core network 130, and a data network 140. Radio access network 120, core network 130, and data network 140 may be collectively referred to as a transport network.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. Additionally, or alternatively, UE device 110 may include a device with wired communication functionality. UE device 110 may include capabilities for voice communication, mobile broadband services (e.g., video streaming, real-time gaming, premium Internet access etc.), best effort data traffic, and/or other types of applications. In some implementations, UE device 110 may communicate using machine-to-machine (M2M) communication, such as machine-type communication (MTC), and/or another type of M2M communication.

According to implementations described herein, UE device 110 may include a secure element or subscriber identity module (SIM), such as a UICC 112. UICC 112 may include a platform that hosts an application and stores subscription profiles. UICC 112 may be embedded (e.g., an eUICC) or inserted into UE device 110. UICC 112 may include various components, such as a processor, a memory, and instructions that provide prioritized SIP registration requests. According to an exemplary embodiment, UICC 112 includes a memory that stores a file or an applet (e.g., a user agent client) that contains the ACC EF for a user. As described further herein, the user agent client may send SIP requests including an RPH that designates a priority connection.

Radio access network 120 may enable UE devices 110 to connect to core network 130 for mobile telephone service, SMS message service, Multimedia Message Service (MMS) message service, Internet access, cloud computing, and/or other types of data services. Radio access network 120 may include wireless stations 125-1 to 125-N (referred to herein collectively as "wireless stations 125" and individually as "wireless station 125"). Each wireless station 125 may service a set of UE devices 110. For example, wireless station 125-1 may service some UE devices 110 when the UE devices 110 are located within the geographic area serviced by wireless station 125-1, while other UE devices 110 may be serviced by another wireless station 125-N when the UE devices 110 are located within the geographic area serviced by the other wireless station 125-N.

Wireless station 125 may include, for example, a 4G base station (e.g., an evolved Node B or eNB) or a 5G base station (e.g., a gNB) that includes one or more radio frequency (RF) transceivers (also referred to as "cells" and/or "base station sectors") facing particular directions. In other implementations, wireless station 125 may also include an access device for a future generation wireless network, an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node (e.g., a WiFi device, a WiMax device, a hot spot device, etc.) that provides a wireless access service.). Furthermore, in some implementations, wireless station 125 may include a mobile edge computing (MEC) system that performs cloud computing and/or network processing services for UE devices 110.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that does not require the establishment of an IP connection between UE device 110 and data network 140, such as, for example, Data over Non-Access Stratum (DoNAS). Core network 130 may include one or multiple networks of one or multiple types. For example, core network 130 may include a terrestrial network and/or a satellite network. According to an exemplary implementation, core network 130 includes a network pertaining to multiple access networks 120. For example, core network 130 may include the core part of an LTE network, an LTE-A network, a 5G network, a future wireless network, a legacy network, and so forth.

Depending on the implementation, core network 130 may include various network elements that may be implemented in network devices 135. Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 130. In the context of a 4G network that is configured to support 5G UEs, core network 130 may include one or more network devices 135 with combined 4G and 5G functionality, such as a session management function with PDN gateway-control plane (SMF+PGW-C) and a user plane function with PDN gateway-user plane (UPF+PGW-U).

Data networks 140 may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110. For example, in some implementations, a particular data network 140 may include an IMS network (not shown in FIG. 1). The IMS network may include a network for delivering IP multimedia services and may provide media flows between two different UE devices 110, and/or between a particular UE device 110 and external IP networks or external circuit-switched networks (not shown in FIG. 1). In the context of an IMS network, data network 140 may include various types of network devices 145, which may implement different network functions described further herein.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
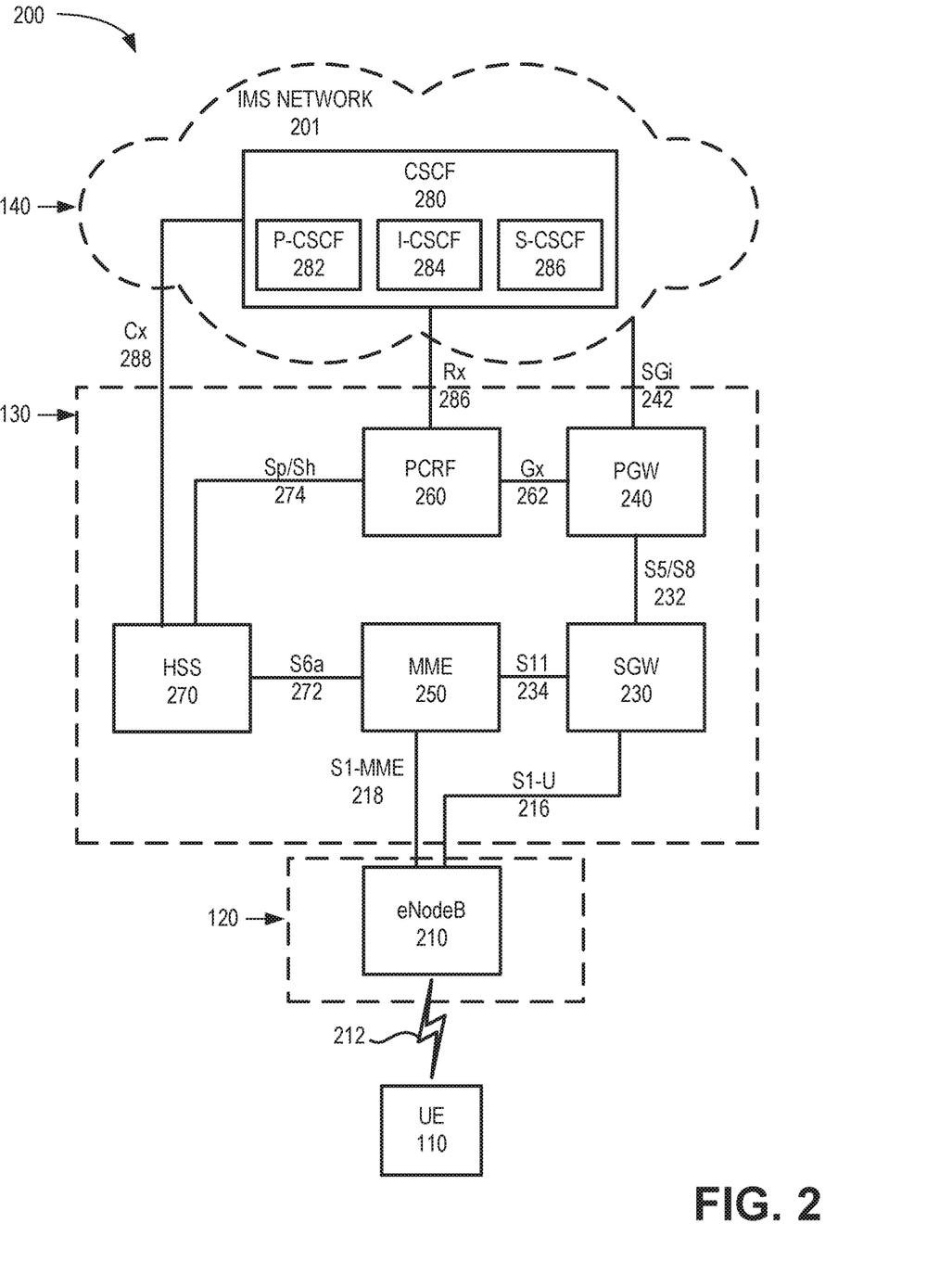
FIG. 2 is a diagram illustrating exemplary components of the core network and the data network of FIG. 1 according to an implementation described herein.

FIG. 2 illustrates a network 200 that includes exemplary components of core network 130 and data network 140. In the configuration of FIG. 2, core network 130 includes a 4G LTE core network according to an implementation described herein. As shown in FIG. 2, network 200 may include UE device 110, an eNodeB 210 within access network 120, core network 130, and an IMS network 201. IMS network 201 may correspond to, or be included in, data network 140. eNodeB 210 may correspond to, or be included in, wireless station 125. eNodeB 210 may communicate with UE device 110 using a 4G LTE air interface referred to as an Evolved Universal Mobile Telecommunications System (UMTS) Terrestrial Radio Access Network (E-UTRA) interface 212.

As shown in FIG. 2, core network 130 may include a Serving Gateway (SGW) 230, a Packet Data Network (PDN) Gateway (PGW) 240, a Mobility Management Entity (MME) 250, a Policy and Charging Rules Function (PCRF) 260, and HSS 270. IMS network 201 may include a CSCF 280. Each of the elements shown in core network 130 may correspond to one or more network devices 135, while each of the elements shown in IMS network 201 may correspond to one or more network devices 145. While FIG. 2 depicts a single eNodeB 210, a single SGW 230, a single PGW 240, a single MME 250, a single PCRF 260, a single HSS 270, and a single CSCF 280 for illustration purposes, in practice, network 200 may include multiple eNodeBs 210, multiple SGWs 230, multiple PGWs 240, multiple MMEs 250, multiple PCRFs 260, multiple HSSes 270, and/or multiple CSCFs 280.

The components depicted in FIG. 2 may be implemented as dedicated hardware components or as virtualized functions implemented on top of a common shared physical infrastructure using software defined networking (SDN). For example, an SDN controller may implement one or more of the components of FIG. 2 using an adapter implementing a VNF virtual machine, a CNF container, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 described below with reference to FIG. 3 using a MEC system associated with wireless stations 125.

eNodeB 210 may interface with core network 130 via an interface referred to as an S1 interface, which may include both a control plane S1-MME interface 218 and a data plane S1-U interface 216. S1-MME interface 218 may interface with MME 250. S1-MME interface 218 may be implemented, for example, with a protocol stack that includes a Non-Access Stratum (NAS) protocol and/or Stream Control Transmission Protocol (SCTP). An S1-U interface 216 may interface with SGW 230 and may be implemented, for example, using GTPv2.

SGW 230 may provide an access point to and from UE device 110, may handle forwarding of data packets for UE device 110, and may act as a local anchor point during handover procedures between different eNodeBs 210. SGW 230 may interface with PGW 240 through an S5/S8 interface 232. S5/S8 interface 232 may be implemented, for example, using GTPv2. PGW 240 may function as a gateway to IMS network 201 through an SGi interface 242. A particular UE device 110, while connected to a single SGW 230, may be connected to multiple PGWs 240, one for each data network 140 with which UE device 110 communicates. For example, a particular PGW 240 may be associated with a particular access point name (APN), and UE device 110 may connect to the particular APN by connecting to the PGW 240 associated with the particular APN. Thus, UE device 110 may be connected to one or more APNs at a particular time.

MME 250 may implement control plane processing for core network 130. For example, MME 250 may manage the mobility of UE device 110, implement tracking and paging procedures for UE device 110, activate and deactivate bearers for UE device 110, authenticate a user of UE device 110, and/or interface to non-LTE radio access networks. A bearer may represent a logical channel with particular quality of service (QoS) requirements. MME 250 may also select a particular SGW 230 for a particular UE device 110. A particular MME 250 may interface with other MMEs 250 (not shown in FIG. 2) in core network 130 and may send and/or receive information associated with UE devices 110, which may allow one MME 250 to take over control plane processing of UE devices 110 serviced by another MME 250, if the other MME 250 becomes unavailable. Furthermore, MME 250 may manage non-IP communication with UE device 110 using NAS. MME 250 may page UE device 110 based on mobility category information associated with UE device 110 obtained from HSS 270.

MME 250 may communicate with SGW 230 through an S11 interface 234. S11 interface 234 may be used to create and manage a new session for a particular UE device 110. S11 interface 234 may be activated when MME 250 needs to communicate with SGW 230, such as when the particular UE device 110 attaches to core network 130, when bearers need to be added or modified for an existing session for the particular UE device 110, when a connection to a new PGW 240 needs to be created, or during a handover procedure (e.g., when the particular UE device 110 needs to switch to a different SGW 230).

PCRF 260 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF 260 may communicate with PGW 240 through a Gx interface 262.

HSS 270 may store subscription information associated with UE devices 110 and/or information associated with users of UE devices 110. For example, HSS 270 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. If UE device 110 is associated with a 4G subscription, HSS 270 may store a 4G subscription profile for UE device 110, and if UE device 110 is associated with a 5G subscription, HSS may store a 5G subscription for UE device 110. Furthermore, the subscription profile may include a Subscription-Type AVP that identifies whether a UE device 110 is associated with a 5G subscriber. HSS 270 may communicate with MME 250 through an S6a interface 272 and may communicate with PCRF device 260 using an Sp/Sh interface 274.

IMS network 201 may be associated with an IMS core identity for a particular subscription for UE device 110. HSS 250 may receive information identifying the IMS core identity for a subscription and may provide the IMS core identity to a particular UE device 110 that is connected to access network 130. CSCF 280 may handle signaling, controlling of media paths, and activation of applications in IMS network 201. CSCF 280 may communicate with PCRF 260 through an Rx interface 286 and may communicate with HSS 250 through a Cx interface 288. Rx interface 286 and Cx interface 288 may be implemented, for example, using Diameter protocol.

CSCF 280 may include multiple network devices or functions including one or more Proxy Call Session Control Function (P-CSCF) 282, Interrogating Call Session Control Function (I-CSCF) 284, and Serving Call Session Control Function (S-CSCF) 286. P-CSCF 282, I-CSCF 284, and S-CSCF 286 may be generically and collectively referred to herein as "CSCF 280."

P-CSCF 282 acts as an edge of IMS network 201 through which UE device 110 obtains access. P-CSCF 282 maintains an awareness of all IMS endpoints that are currently registered with IMS network 201, and performs various manipulations of SIP signaling messages that are arriving from, or being sent to, the IMS endpoints (e.g., UE devices 110-1, 110-2, etc.). P-CSCF 282 maintains a connection with, for example, S-CSCF 286.

I-CSCF 284 passes SIP signaling to/from respective S-CSCFs 282 for different endpoints (e.g., UE devices 110-1 and 110-2). I-CSCF 284 may query core network 130 (e.g., HSS 270 or a UDM) to learn the identity of the S-CSCF 286 assigned to a given UE device 110 so that I-CSCF 284 can properly forward the SIP signaling.

S-CSCF 286 processes all originating and terminating SIP requests and responses associated with endpoints registered with S-CSCF 286 (e.g., UE devices 110). S-CSCF 286 routes the terminating SIP signaling towards its destination (e.g., towards a P-CSCF 282 for a terminating UE device 110-1), or originating SIP signaling towards another UE device 110-2 via I-CSCF 284. S-CSCF 286 may obtain from core network 130 (e.g., HSS 270 or a UDM) information identifying a gateway or network function that serves a call recipient (e.g., UE device 110-2).

Although FIG. 2 shows exemplary components network 200, in other implementations, network 200 may include fewer components, different components, differently-arranged components, or additional components than depicted in FIG. 2. Additionally, or alternatively, one or more components of network 200 may perform functions described as being performed by one or more other components of network 200.

Figure 3:
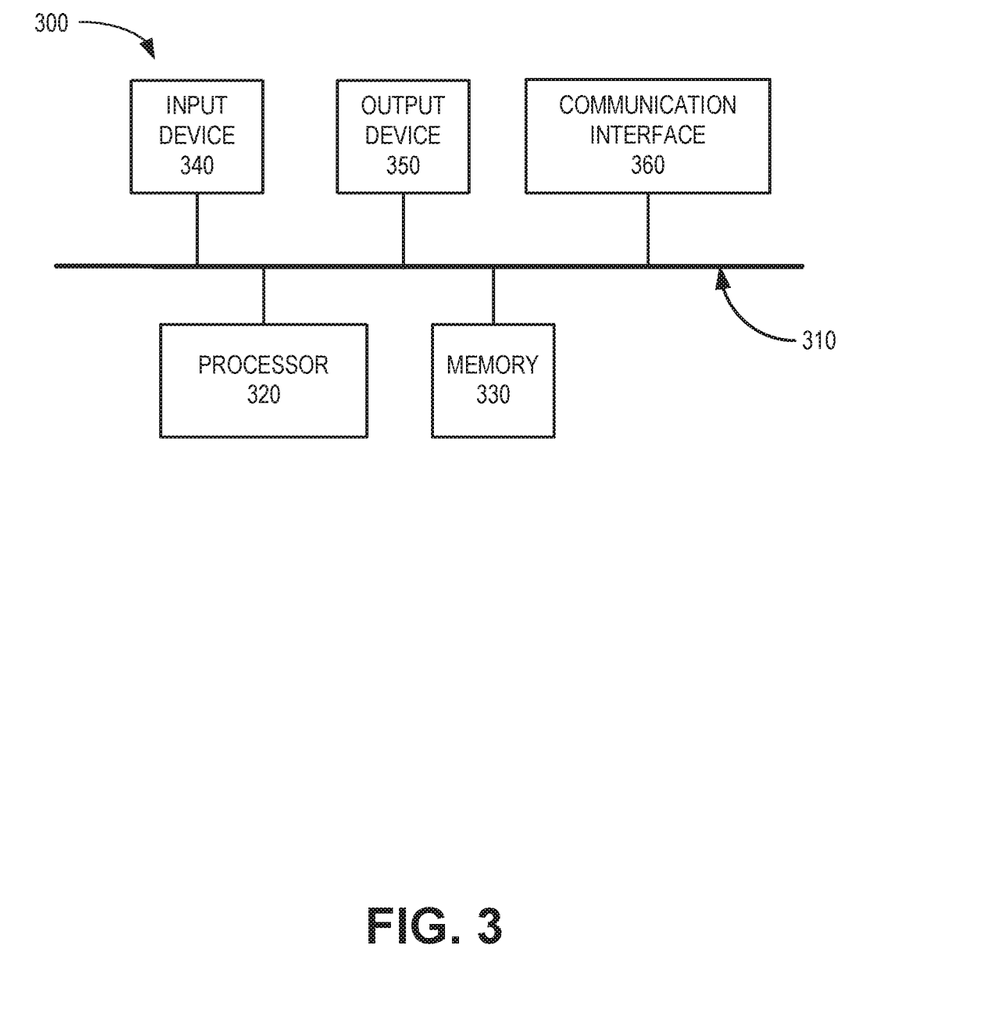
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. UE device 110, wireless station 125, network devices 135, network devices 145, and/or other components of access network 120, core network 130, and data network 140 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to prioritizing SIP Register messages for IMS network connections. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
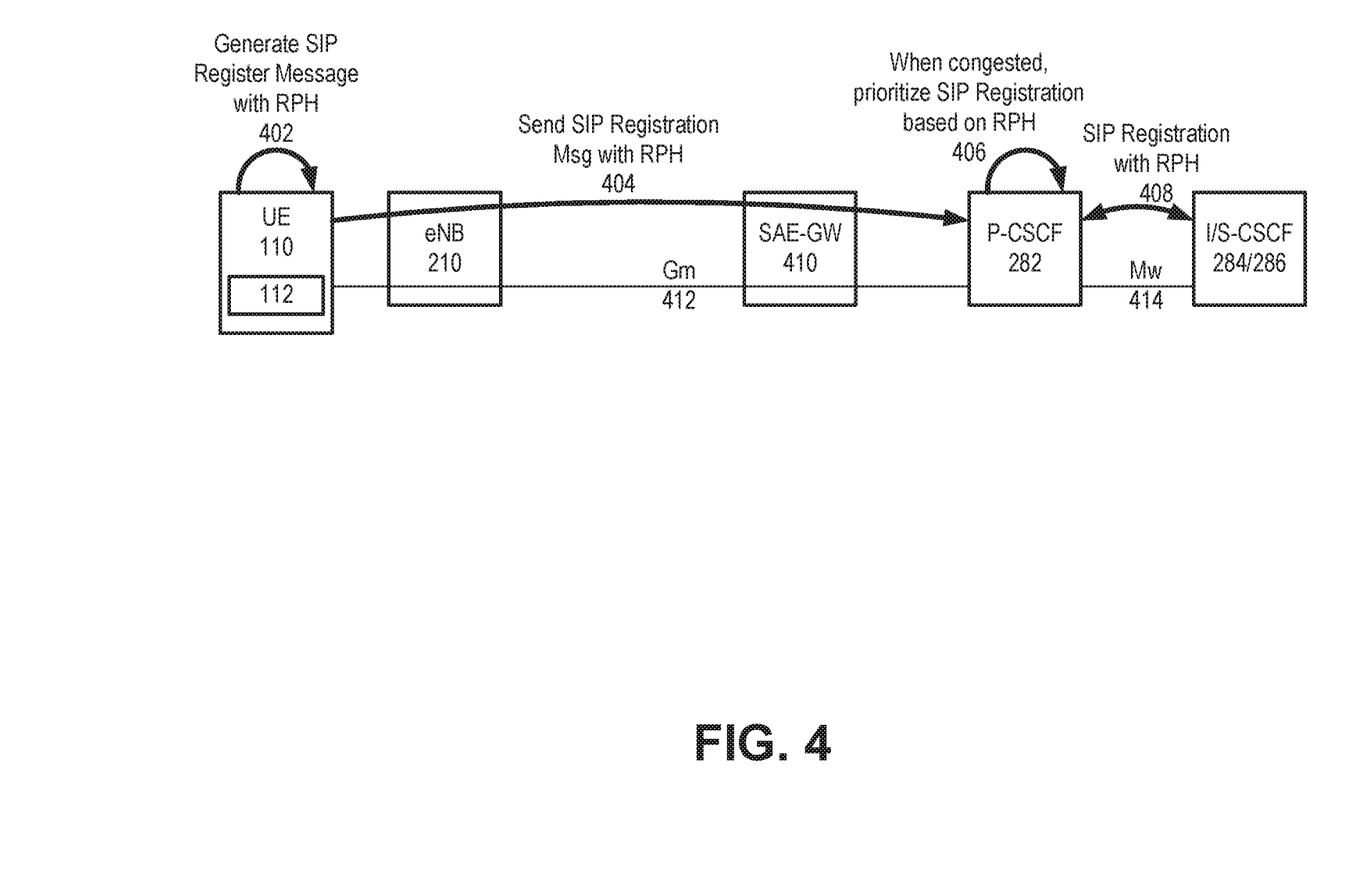
FIG. 4 is a block diagram illustrating communications to provide priority SIP registration according to an implementation described herein.

FIG. 4 is a block diagram illustrating communications in a portion 400 of network 200 to provide priority SIP registration according to an implementation described herein. As shown in FIG. 4, network portion 400 may include UE device 110, eNodeB 210, P-CSCF 282, I-CSCF 284, S-CSCF 286, and an (SAE-GW) 410. SAE-GW 410 may function as both a serving gateway (e.g., SGW 230) and a packet data network gateway (e.g., PGW 240). I-CSCF 284 and S-CSCF 286 are shown as a combined node in FIG. 4 for simplicity.

Network portion 400 includes a Gm interface 412, between a UE device 110 and P-CSCF 282, and an Mw 414 interface. Gm interface 412 is a SIP-based interface that enables connectivity between UE 110 and IMS network 201 for registration, authentication, encryption, and session control using, for example, SIP protocol. Mw interface 414 is a SIP-based interface between different CSCF nodes within the IMS core network (e.g. P-CSCF 282 to I/S-CSCF 284/286).

As shown in FIG. 4, when a user initiates an IMS connection (e.g., for a VoLTE call, a media session, or another type of end device session), UE device 110 may generate a SIP Register message that includes a SIP RPH. According to an exemplary embodiment, UICC 112 of UE device 110 includes a memory that stores a file or an applet (e.g., also referred to as a user agent client) that contains the ACC EF for a user. The ACC EF consists of 16 bits corresponding to 15 access classes (e.g., as defined in 3GPP specifications). ACC Bits 0-9 may correspond to Standard Access Class users, while ACC Bits 11-15 may correspond to the following Special Access Classes:

11—Public Land Mobile Network (PLMN) Use
12—Security Services
13—Public Utilities
14—Emergency Services
15—PLMN Staff.

According to an implementation, if any of the 11-15 bits above are set to TRUE in the ACC EF of UICC 112, the user agent client may insert the SIP RPH into the SIP Register message. In one implementation, the SIP RPH may use a priority indication format similar to that used for established priority connections:

Resource-Priority: namespace1.x, namespace2.x.

The terms "namespace1" and "namespace2" may refer to designated priority assignments, such as "ets" or "wps," where "ets" refers to "Government Emergency Telecommunications Service" and "wps" refers to "Wireless Priority Service." According to other implementations, fewer (e.g., 1) or more namespaces may be used in the SIP RPH. Each namespace may be assigned a particular resource value, designated by "x." The "x" value may be determined by government and operator entities and may range, for example, from 0 to 4 with 0 having highest priority and 4 having lowest priority. Other ranges and/or priorities may be configured.

Figure 5:
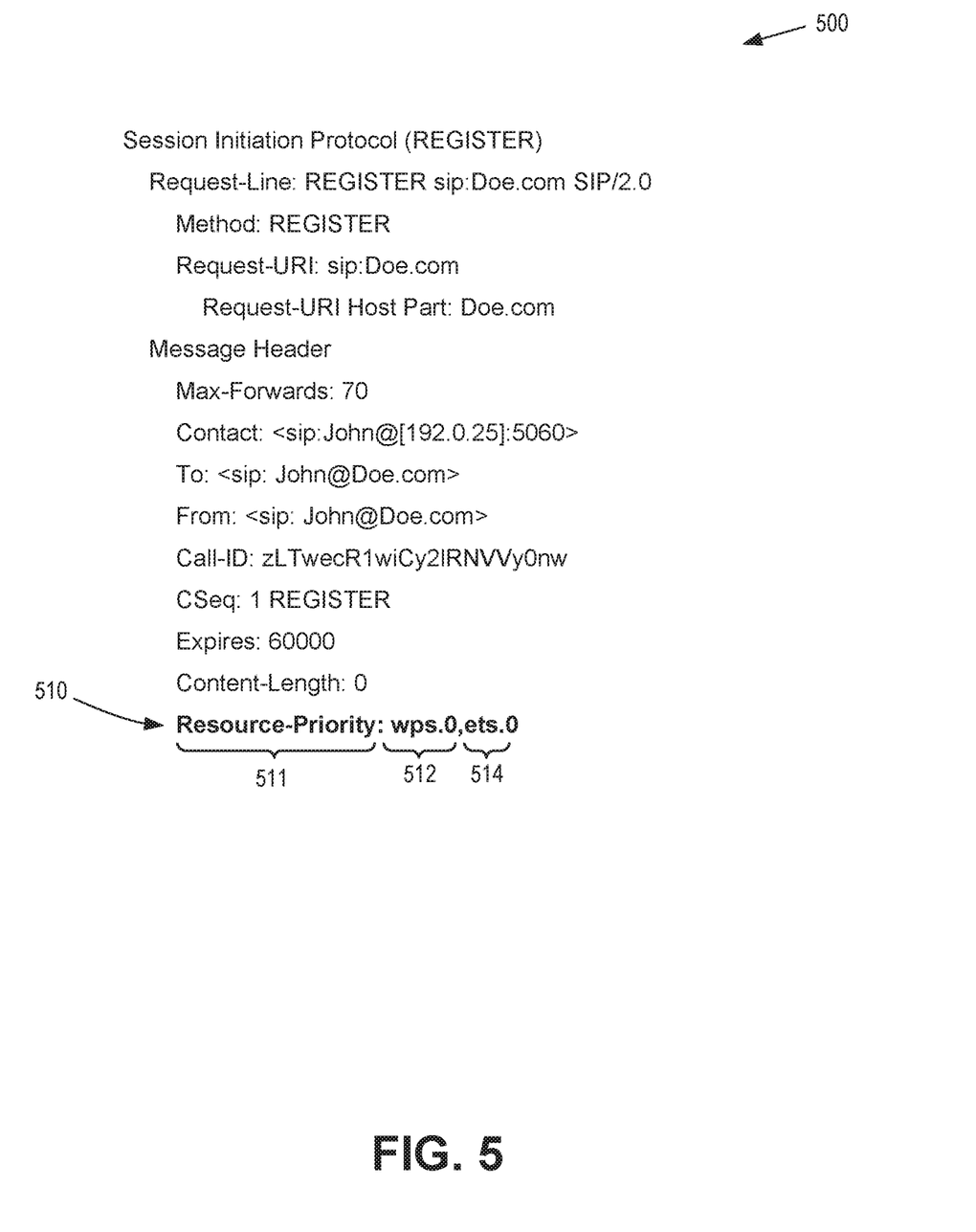
FIG. 5 is a diagram illustrating exemplary information in a SIP Register message according to an implementation described herein.

A sample SIP Register message 500 that includes a SIP RPH 510 is shown in FIG. 5. According to one implementation, SIP RPH 510 may be inserted into SIP Register message 500 when the user agent client identifies a priority access class (e.g., when any of the 11-15 bits above are set to TRUE in the ACC EF). In the example of FIG. 5, SIP RPH 510 may include a header label 511 (e.g., "Resource-Priority"), a first namespace 512 (e.g., "wps") with a highest priority resource value "0," and a second namespace 514 (e.g., "ets") with a with a highest priority resource value "0." The order of the namespace values 512 and 514 (e.g., "ets" and "wps") may be interchangeable.

Returning to FIG. 4, UE device 110 may send the SIP Register message (e.g., SIP Register message 500) to P-CSCF 282 via a Gm interface 412, as indicated by reference 404, to initiate an IMS connection. P-CSCF 282 may receive the SIP Register message (e.g., SIP Register message 500) and process the SIP Register message, as indicated at reference 406. In the example of SIP RPH 510, the value "0" for namespace 512 ("ets") and namespace 514 ("wps") in SIP RPH 510 indicates a highest priority, hence P-CSCF 282 will process SIP Register message 500 first if there is congestion. The level of congestion required to trigger acting on SIP RPH 510 may be configurable for an IMS network. In one example, congestion indicating an overload state may include a threshold number of pending requests or a percentage of available resources at a CSCF 280 element. In the event that no resources are available at P-CSCF 282, the prioritized SIP Register message 500 shall be added to a queue and follow a Priority Queuing algorithm. The Priority Queuing algorithm may, for example, include correlations/mappings between congestion levels and priorities indicated in the RPH.

According to implementations described herein, for a SIP Register message, if a node in CSCF 280 (e.g., P-CSCF 282) receives a message with a SIP RPH, it includes the same RPH and priority values to subsequent SIP nodes, such as I-CSCF 284, S-CSCF 286, or third party applications required to complete the registration. Thus, P-CSCF 282 may direct registration requests 408 to I-CSCF 284 (or between I-CSCF 284 and S-CSCF 286) via Mw interface 414 using the same RPH 510 as included in SIP Registration message 500 of signal flow 404.

While communications in FIG. 4 are described in the context of inserting SIP RPH 510 only for UE devices 110 assigned to a priority class, in another implementation, SIP RPH 510 may be inserted into SIP Register message 500 to indicate other (e.g., non-priority) classes, which may be processed, for example, by CSCF 280 accordingly.

Figure 6A:
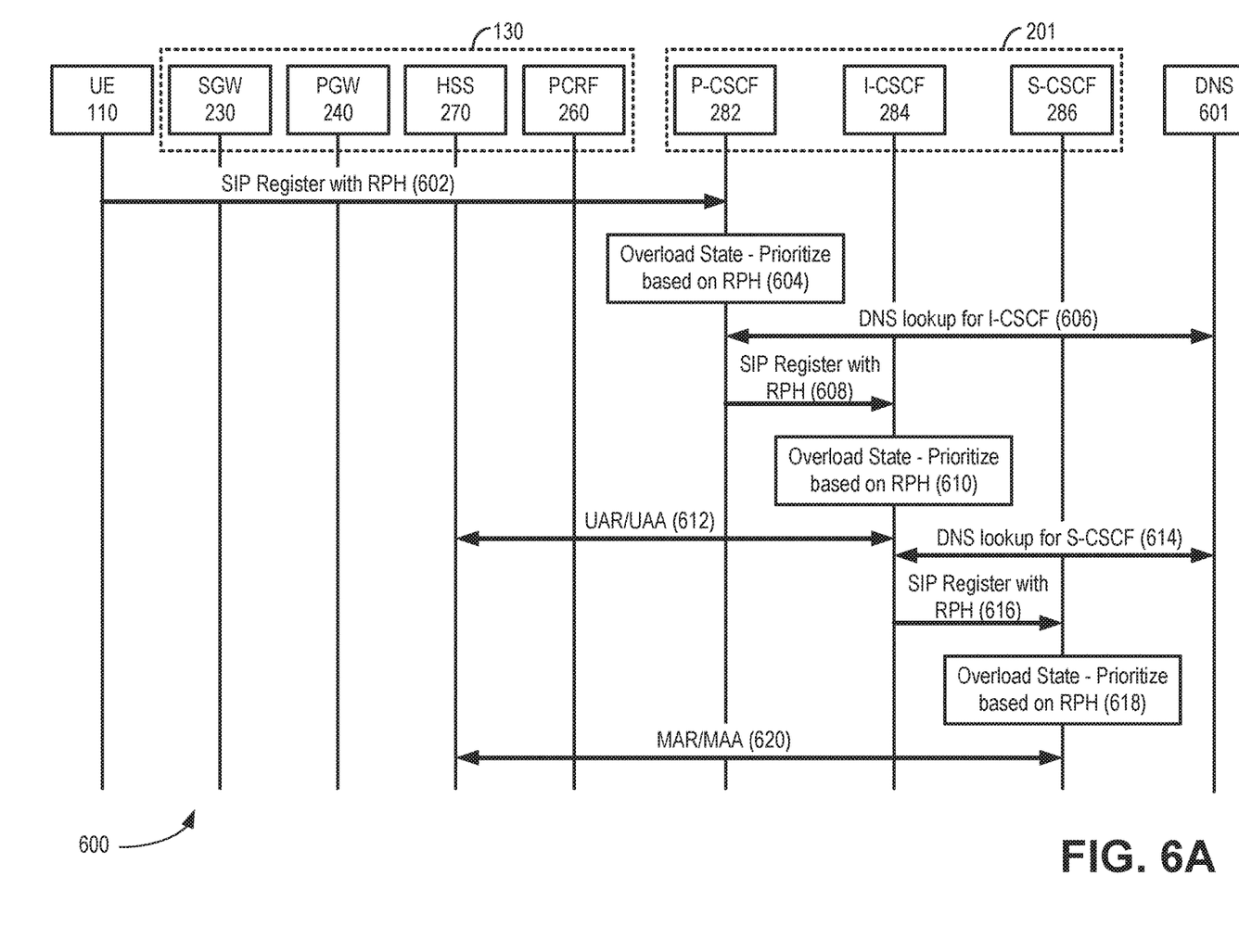
FIGS. 6A and 6B are signal flow diagrams illustrating exemplary communications to implement priority SIP registration according to an implementation.
Figure 6B:
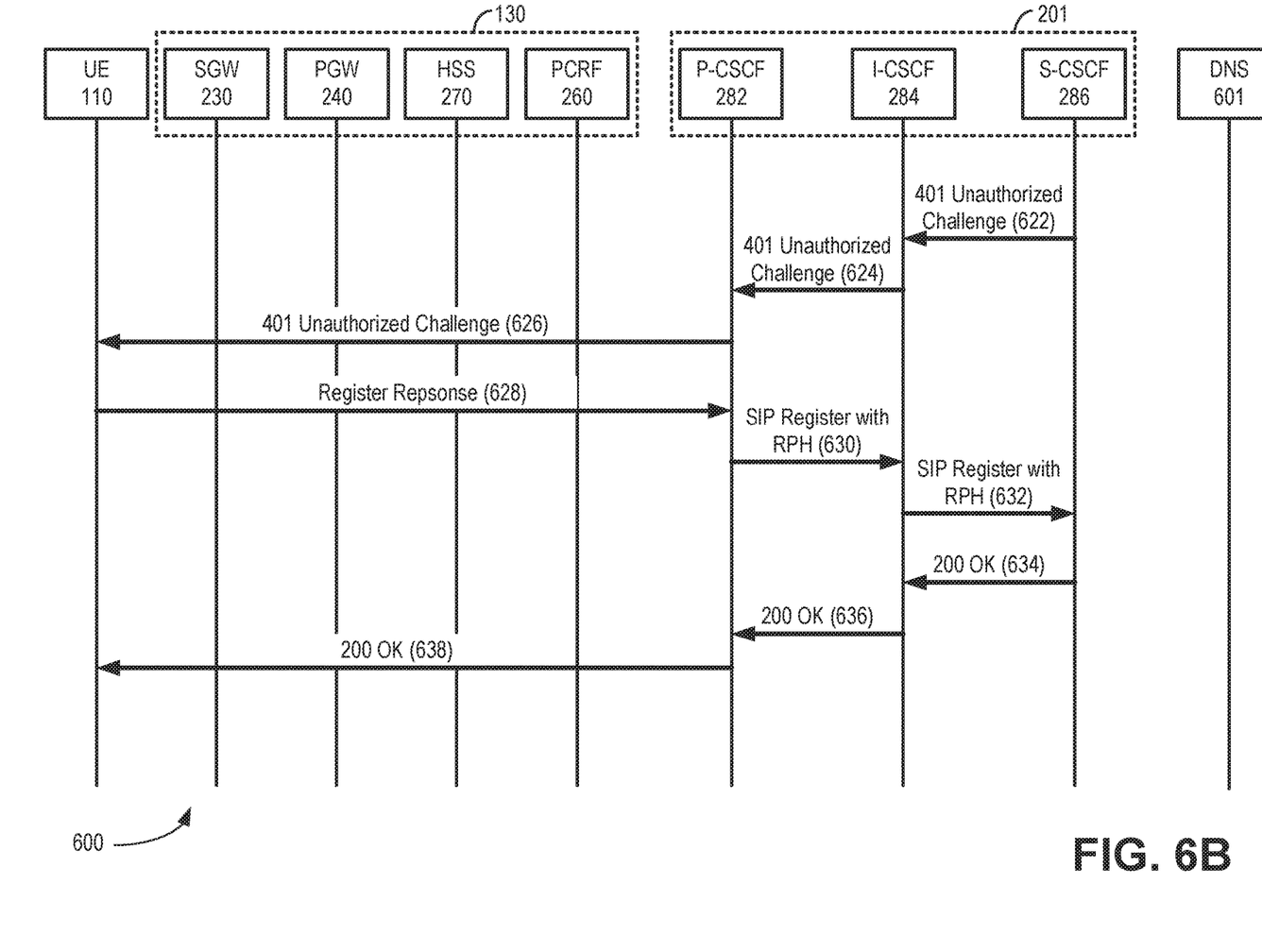

FIGS. 6A and 6B are signal flow diagrams illustrating exemplary communications in a network 600. As shown in FIGS. 6A-6B, network 600 may include UE device 110; SGW 230, PGW 240, PCRF 260, and HSS 270 of core network 130; P-CSCF 282, I-CSCF 284, and S-CSCF 286 of IMS network 201; and Domain Name Service (DNS) device 601. DNS device 601 may include a network device to resolve the lookup requests (e.g., from CSCF element 280) by identifying the IP address associated with a URL and providing the identified IP address to the CSCF 280 element.

Communications in FIGS. 6A and 6B reflect processing a connection request for establishing a new IMS connection. Communications shown in FIG. 6A-6B provide simplified illustrations of communications in network portion 600 and are not intended to reflect every signal or communication exchanged between devices/functions.

As shown in FIG. 6A, UE device 110 may generate and send 602 a SIP Register message with RPH to P-CSCF 282. For example, UE device 110 may send SIP Register message 500 via Gm interface 412. P-CSCF 282 may detect P-CSCF 282 is in an overload state, as indicated at 604, detect the SIP RPH (e.g., RPH 510) in the SIP Register message, and prioritize the SIP Register message. For example, P-CSCF 282 may prioritize selection of an I-CSCF 284 based on, for example, a home domain indicated in the SIP register message. In one implementation, P-CSCF 282 may select an I-CSCF 284, based on a local configuration or DNS look up 606. P-CSCF 282 may forward the SIP Register message (e.g., with SIP RPH 510) to the selected I-CSCF 284, as indicated at signal flow 608.

I-CSCF 284 may receive the SIP register message with RPH from P-CSCF 282, may detect I-CSCF 284 is in an overloaded state, and may apply priority values from SIP RPH 510, as indicated at 610. As indicated at 612, I-CSCF 284 may prioritize sending a User-Authorization-Request (UAR) Diameter request message to HSS 270 and receive a User-Authorization-Answer (UAA) message (signal flow 612) to authenticate UE device 110. If the authentication request response from the HSS 270 is successful, I-CSCF 284 may retrieve the assigned S-CSCF 286 address for UE device 110. If needed, I-CSCF 284 may select a S-CSCF 286, based on a local configuration or DNS look up 614. I-CSCF 284 may forward the SIP Register message (e.g., with SIP RPH 510) to the selected S-CSCF 286, as indicated at signal flow 616.

S-CSCF 284 may receive the SIP register message from I-CSCF 284. Similar to I-CSCF 284, S-CSCF 286 may detect S-CSCF 286 is in an overloaded state, and may apply priority values from SIP RPH 510, as indicated at 618. As indicated at 620, S-CSCF 286 may send a Multimedia-Authentication-Request (MAR) Diameter request message to HSS 270 and receive a Multimedia-Authentication-Answer (MAA) message (signal flow 620) to authenticate UE device 110 and bind S-CSCF 286 to UE device 110.

Referring to FIG. 6B, S-CSCF 286 may perform registration procedures which may include challenging the UE device 110 for authentication credentials. For example, S-CSCF 286 may perform an authentication challenge by sending a SIP 401 unauthorized message to UE device 110 (signal flows 622-626). UE device 110 may respond with a new SIP Register message (e.g., including the same SIP RPH) along with the authentication responses via P-CSCF 282 and I-CSCF 284 (signal flows 628-632). S-CSCF 286 may accept the registration from UE device 110 and send back a registration confirmation (e.g., a SIP 200 OK message in response to the SIP Register message) to UE device 110 via I-CSCF 284 and P-CSCF 282 (signal flows 634-638).

Figure 7:
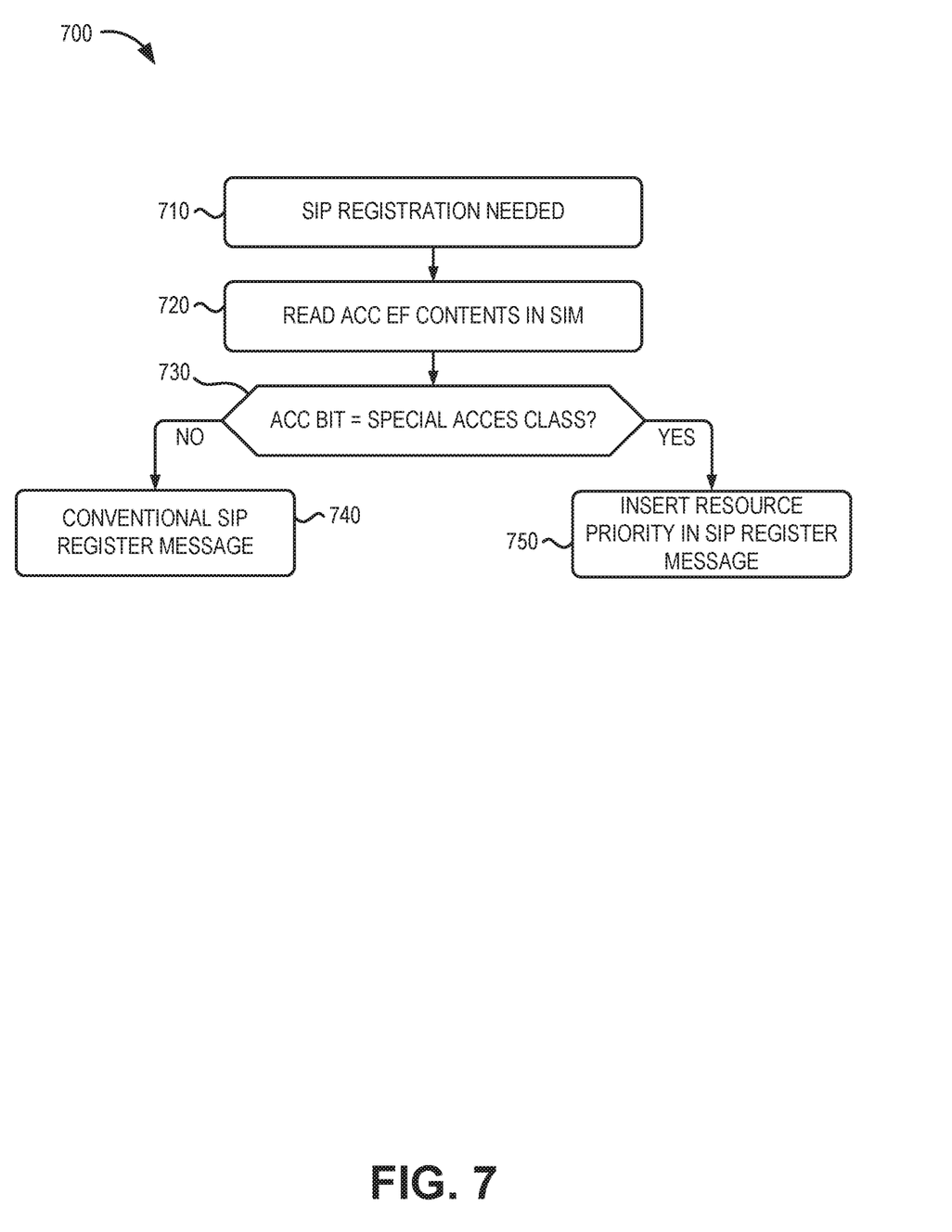
FIG. 7 is a flow diagram illustrating an exemplary process for providing a prioritized SIP Registration request according to an implementation described herein.

FIG. 7 is a flow diagram illustrating an exemplary process 700 for providing a prioritized SIP Registration request, according to an implementation described herein. In one implementation, process 700 may be implemented by UE device 110. In another implementation, process 700 may be implemented by UE device 110 in conjunction with one or more network devices in network environment 100.

Process 700 may include detecting a need for SIP registration (block 710), reading UAC, ACC and/or EF contents in a SIM (block 720), and determining whether the UE device is assigned to a special access class (block 730). For example, a user of UE device 110 may power on UE device 110, which may cause UE device 110 to seek a connection with IMS network 201. UE device 110 may read the ACC EF stored in the UICC 112 to identify if UE device 110 is assigned to a special access class or a standard access class.

If the UE device is not assigned to a special access class (block 700—No), process 700 may further include providing a conventional SIP Register message (block 740). For example, if UICC 112 includes ACC bit values of 0-9 (e.g., Standard Access Class values). UE device 110 may send a SIP Register message that does not include an SIP RPH. Alternatively, UE device 110 may send a SIP Register message that includes a SIP RPH with a low priority indication.

If the UE device is assigned to a special access class (block 700—Yes), process 700 may further include providing a SIP Register message with a resource priority (block 750). For example, UE device 110 may generate a SIP Register message that includes a SIP RPH. The SIP RPH may include, for example, Resource-Priority: wps.0,ets.0, indicating a highest priority for the requested connection, or some other form of data and/or syntax that indicates a priority.

Figure 8:
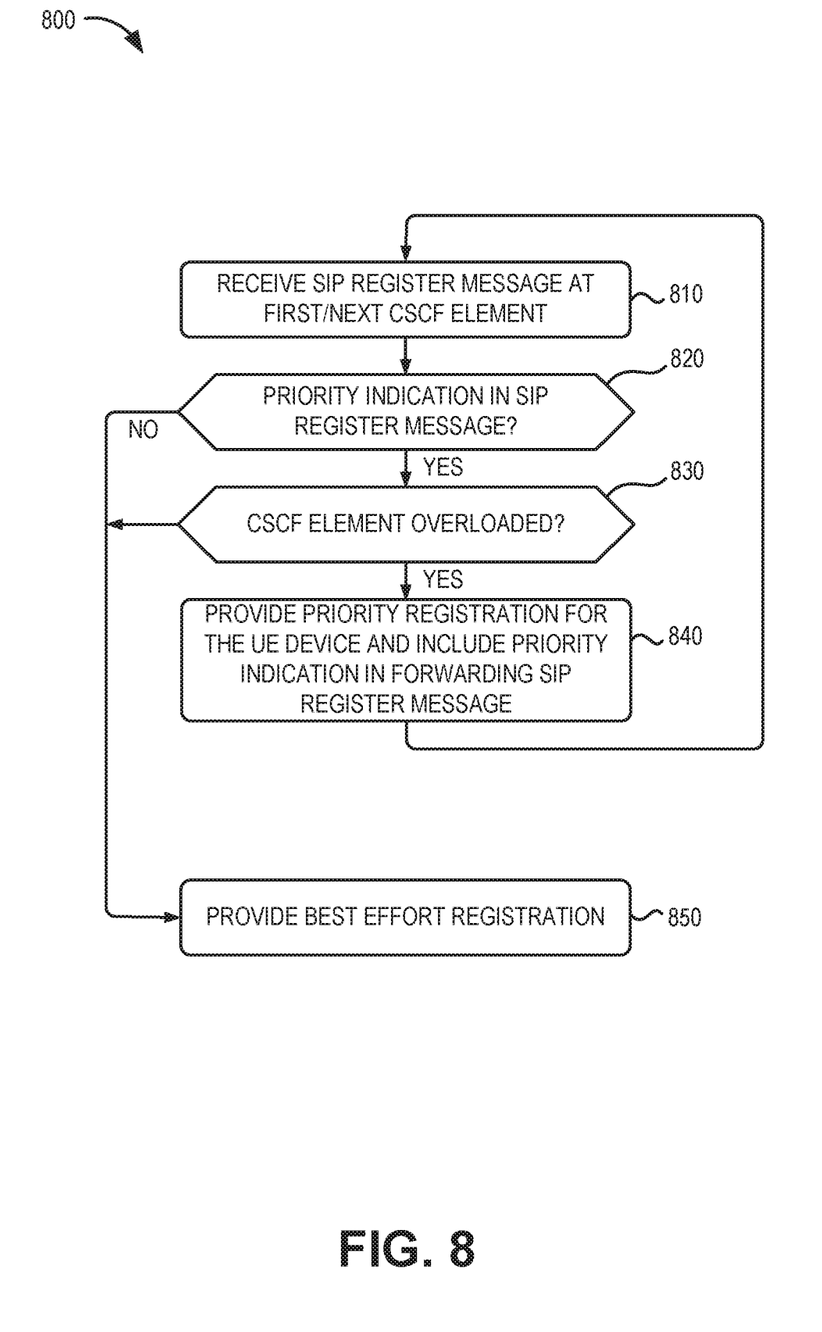
FIG. 8 is a flow diagram illustrating an exemplary process for handling a prioritized SIP Registration request according to an implementation described herein.

FIG. 8 is a flow diagram illustrating an exemplary process 800 for handling a prioritized SIP Registration request, according to an implementation described herein. In one implementation, process 800 may be implemented by CSCF 280. In another implementation, process 800 may be implemented by P-CSCF 282 in conjunction with one or more network devices in network environment 100.

Process 800 may include receiving a SIP Register message at a first CSCF element (block 810) and determining if the SIP Register message includes a priority indication (block 820). For example, in one implementation, P-CSCF 282 may receive, from UE device 110, a SIP Register message 500 that includes SIP RPH 510. P-CSCF 282 may determine if SIP RPH 510 is present or, alternatively, if SIP RPH 510 is present and indicates a priority connection (e.g., a with priority above a standard connection).

If the SIP Register message includes a priority indication (block 820—Yes), process 800 may further include determining if the CSCF element is overloaded (block 830). For example, P-CSCF 282 may determine whether a congestion request threshold has been reached, based on, for example, a number of pending requests or percentage of available resources at P-CSCF 282.

If the CSCF element is overloaded (block 830—Yes), process 800 may include providing priority registration for the UE device and including the priority indication in a forwarding SIP Register message (block 840). For example, P-CSCF 282 may determine that a congestion level is exceeded and apply to a SIP Register message for I-CSCF 284 the same SIP RPH (e.g., SIP RPH 510) from UE device's 110 originating SIP Register message. As further shown in FIG. 8, the next CSCF element (e.g., I-CSCF 284) may return to process block 810 to receive the SIP register message from P-CSCF 282.

If the SIP Register message does not include a priority indication (block 820—No) or if the CSCF element is not overloaded (block 830—Yes), process 800 may include providing best effort registration (block 850). For example, P-CSCF 282 may use conventional SIP registration processing when no SIP RPH is included in a SIP Register message. Similarly, P-CSCF 282 may ignore SIP RPH 510 when no congestion or overload conditions are present for P-CSCF 282.

Systems and methods described herein implement prioritized IMS registration procedures for Emergency and Priority Service users. A network device in an IMS network, receives, from a user equipment device, a SIP Register message that includes a priority indication. The network device detects the priority indication in the SIP Register message and provides, based on the priority indication, priority registration for the user equipment device when the network device is in an overloaded condition.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, while examples described herein have been primarily described in the context of a SIP RPH, other forms of priority indications may be used Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 7 and 8, the order of the blocks may be modified according to other embodiments. As an example, the order process block 820 and 830 of FIG. 8 may be interchangeable. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device in an IP Multimedia System (IMS) network and from a user equipment device, a Session Initiation Protocol (SIP) Register message including a priority indication;
   detecting, by the network device, the priority indication in the SIP Register message; and
   providing, by the network device and based on the priority indication, priority registration for the user equipment device when the network device is in an overloaded condition, wherein providing the priority registration comprises:
   prioritizing selection of an Interrogating Call Session Control Function (I-CSCF), and
   forwarding the SIP Register message with the priority indication to the I-CSCF.

2. The method of claim 1, wherein detecting the priority indication further comprises:
   detecting a Resource-Priority Header (RPH) in the SIP Register message.

3. The method of claim 2, wherein the RPH includes a priority value for an Emergency Telecommunications Service or Wireless Priority Service.

4. The method of claim 1, wherein the priority indication corresponds to a designation for Emergency and Priority Service users.

5. The method of claim 1, wherein the network device includes a Proxy Call Session Control Function (P-CSCF).

6. The method of claim 1, further comprising:
   inserting, by the network device, the priority indication into a forwarded SIP register message toward another network device in the IMS network.

7. The method of claim 6, wherein the network device includes a Proxy Call Session Control Function (P-CSCF), and wherein the other network device includes a Serving Call Session Control Function (S-CSCF).

8. The method of claim 1, further comprising:
   sending, by the network device and via an Mw interface, another SIP Register message with the priority indication to another network device in the IMS network.

9. The method of claim 1, wherein providing priority registration further comprises:
   prioritizing sending a user authorization request for the UE device.

10. A network device, comprising:
    a memory storing instructions; and
    a processor configured to execute the instructions to:
    receive, in an IP Multimedia System (IMS) network and from a user equipment device, a Session Initiation Protocol (SIP) Register message including a priority indication;

detect the priority indication in the SIP Register message; and provide, based on the priority indication, priority registration for the user equipment device when the network device is in an overloaded condition, wherein providing the priority registration comprises:
prioritizing selection of an Interrogating Call Session Control Function (I-CSCF), and
forwarding the SIP Register message with the priority indication to the I-CSCF.

11. The network device of claim 10, wherein the priority indication includes a Resource-Priority Header (RPH) in the SIP Register message.

12. The network device of claim 11, wherein the RPH includes a priority value for an Emergency Telecommunications Service or Wireless Priority Service.

13. The network device of claim 10, wherein the network device includes a Proxy-Call Session Control Function (P-CSCF).

14. The network device of claim 10, wherein the processor is further configured to:
insert the priority indication into a forwarded SIP register message toward another network device in the IMS network.

15. The network device of claim 10, wherein, when receiving the SIP register message, the processor is further configured to:
receive the SIP register message via a Gm interface.

16. The network device of claim 10, wherein the processor is further configured to:
send, via an Mw interface and based on the SIP Register message, another SIP Register message with the priority indication to another network device in the IMS network.

17. A non-transitory computer-readable medium containing instructions executable by at least one processor, the computer-readable medium comprising one or more instructions to:
receive, in an IP Multimedia System (IMS) network and from a user equipment device, a Session Initiation Protocol (SIP) Register message including a priority indication;
detect the priority indication in the SIP Register message; and
provide based on the priority indication, priority registration for the user equipment device when the network device is in an overloaded condition, wherein providing the priority registration comprises:
prioritizing selection of an Interrogating Call Session Control Function (I-CSCF), and
forwarding the SIP Register message with the priority indication to the I-CSCF.

18. The non-transitory computer-readable medium of claim 17, wherein the one or more instructions to detect the priority indication further include instructions to:
detect a Resource-Priority Header (RPH) in the SIP Register message.

19. The non-transitory computer-readable medium of claim 17, further comprising one or more instructions to:
insert the priority indication into a forwarded SIP register message toward another network device in the IMS network.

20. The non-transitory computer-readable medium of claim 17, wherein the one or more instructions to receive the SIP register message further include instructions to:
receive the SIP register message via a Gm interface.

* * * * *